United States Patent
Zhang et al.

(10) Patent No.: US 9,952,682 B2
(45) Date of Patent: Apr. 24, 2018

(54) DEPRESSIBLE KEYS WITH DECOUPLED ELECTRICAL AND MECHANICAL FUNCTIONALITY

(71) Applicant: Apple Inc., Cupertino, CA (US)

(72) Inventors: Chang Zhang, Cupertino, CA (US); Dayu Qu, Cupertino, CA (US); Ray L. Chang, Cupertino, CA (US); John S. Camp, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/687,743

(22) Filed: Apr. 15, 2015

(65) Prior Publication Data

US 2016/0306437 A1 Oct. 20, 2016

(51) Int. Cl.
*G06F 3/02* (2006.01)
*G06F 1/16* (2006.01)

(52) U.S. Cl.
CPC .......... *G06F 3/0202* (2013.01); *G06F 1/1662* (2013.01)

(58) Field of Classification Search
CPC .... G06F 3/0202; G06F 3/0304; H03K 17/969
See application file for complete search history.

(56) References Cited

U.S. PATENT DOCUMENTS

| | | |
|---|---|---|
| 3,056,030 A | 9/1962 | Kelchner |
| 4,133,404 A | 1/1979 | Griffin |
| 4,289,400 A | 9/1981 | Kubola et al. |
| 4,311,990 A | 1/1982 | Burke |
| 4,417,824 A | 11/1983 | Paterson et al. |
| 4,593,194 A | 6/1986 | Graham et al. |
| 4,617,461 A | 10/1986 | Subbarao et al. |
| 4,641,026 A * | 2/1987 | Garcia, Jr. ............ G06F 3/0202 250/229 |
| 4,670,737 A | 6/1987 | Rilling |
| 4,884,073 A | 11/1989 | Souloumiac |
| 4,931,794 A * | 6/1990 | Haag .................. H03K 17/969 200/5 A |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,214,278 A | 5/1993 | Banda |
| 5,288,993 A | 2/1994 | Bidiville et al. |
| 5,471,054 A | 11/1995 | Watanabe |
| 5,572,314 A | 11/1996 | Hyman et al. |
| 5,748,111 A | 5/1998 | Bates |
| 5,841,050 A | 11/1998 | Clift et al. |
| 5,847,335 A | 12/1998 | Sugahara et al. |
| 5,943,233 A * | 8/1999 | Ebina .................. G06F 3/0304 250/221 |

(Continued)

OTHER PUBLICATIONS

U.S. Appl. No. 61/645,033, filed May 9, 2012, 84 pages.

(Continued)

*Primary Examiner* — Sepehr Azari
(74) *Attorney, Agent, or Firm* — Brownstein Hyatt Farber Schreck, LLP

(57) ABSTRACT

Systems and methods for decoupling the electrical and mechanical functionality of a depressible key are disclosed. The depressible key can include a non-contact proximity sensor, such as an optical sensor, to detect motion of the keycap. The output from the optical sensor is used to determine a distance, velocity, acceleration, and a force applied during a keypress.

20 Claims, 7 Drawing Sheets

(56) References Cited

U.S. PATENT DOCUMENTS

| | | | |
|---|---|---|---|
| 5,963,332 | A | 10/1999 | Feldman et al. |
| 6,175,679 | B1 | 1/2001 | Veligdan et al. |
| 6,246,050 | B1 | 6/2001 | Tullis et al. |
| 6,809,275 | B1 | 10/2004 | Cheng et al. |
| 6,985,107 | B2 | 1/2006 | Anson |
| 7,102,626 | B2 | 9/2006 | Denny, III |
| 7,135,673 | B2 | 11/2006 | Saint Clair |
| 7,265,336 | B2 | 9/2007 | Hataguchi et al. |
| 7,761,246 | B2 | 7/2010 | Matsui |
| 7,781,726 | B2 | 8/2010 | Matsui et al. |
| 7,865,324 | B2 | 1/2011 | Lindberg |
| 7,999,199 | B2 | 8/2011 | Villain |
| 8,138,488 | B2 | 3/2012 | Grot |
| 8,368,677 | B2 | 2/2013 | Yamamoto |
| 8,373,661 | B2 | 2/2013 | Lan et al. |
| 8,441,450 | B2 | 5/2013 | Degner et al. |
| 8,477,118 | B2 | 7/2013 | Lan et al. |
| 8,487,237 | B2 | 7/2013 | Watanabe |
| 8,525,777 | B2 | 9/2013 | Stavely et al. |
| 8,593,598 | B2 | 11/2013 | Chen et al. |
| 8,666,682 | B2 | 3/2014 | LaVigne et al. |
| 8,704,787 | B2 | 4/2014 | Yamamoto |
| 8,711,093 | B2 | 4/2014 | Ong et al. |
| 8,743,088 | B2 | 6/2014 | Watanabe |
| 8,859,971 | B2 | 10/2014 | Weber |
| 8,890,045 | B2 | 11/2014 | Toh et al. |
| 8,895,911 | B2 | 11/2014 | Takahashi |
| 8,994,694 | B2 | 3/2015 | Lee et al. |
| 9,041,663 | B2 | 5/2015 | Westerman |
| 9,086,738 | B2 | 7/2015 | Leung et al. |
| 9,134,145 | B2 | 9/2015 | Shimizu |
| 9,285,926 | B2 | 3/2016 | Yang et al. |
| 9,797,752 | B1 | 10/2017 | Ruh et al. |
| 9,797,753 | B1 | 10/2017 | Gowreesunker et al. |
| 2005/0075558 | A1 | 4/2005 | Vecerina et al. |
| 2006/0066576 | A1* | 3/2006 | Kong ............... G06F 3/0202 345/168 |
| 2006/0250377 | A1 | 11/2006 | Zadesky et al. |
| 2007/0146348 | A1 | 6/2007 | Villain |
| 2007/0222756 | A1 | 9/2007 | Wu et al. |
| 2008/0130914 | A1 | 6/2008 | Cho |
| 2008/0278445 | A1 | 11/2008 | Sweetser et al. |
| 2009/0073119 | A1 | 3/2009 | Le et al. |
| 2009/0152452 | A1 | 6/2009 | Lee et al. |
| 2010/0149099 | A1 | 6/2010 | Elias |
| 2012/0113044 | A1 | 5/2012 | Strazisar et al. |
| 2014/0071050 | A1 | 3/2014 | Armstrong-Muntner |
| 2014/0132516 | A1 | 5/2014 | Tsai et al. |
| 2014/0267053 | A1* | 9/2014 | Bajaj .................. H03K 17/969 345/168 |
| 2014/0268150 | A1 | 9/2014 | Leung et al. |
| 2014/0327630 | A1* | 11/2014 | Burr .................... G06F 3/0488 345/173 |
| 2015/0051671 | A1 | 2/2015 | Browne et al. |
| 2016/0061636 | A1 | 3/2016 | Gowreesunker et al. |
| 2017/0115757 | A1 | 4/2017 | Armstrong-Muntner |

OTHER PUBLICATIONS

DeskThorityNet, Optical Switch Keyboards, http://deskthority.net/keyboards-f2/optical-switch-keyboards-t1474.html, 22 pages.

Epstein et al., "Economical, High-Performance Optical Encoders," Hewlett-Packard Journal Oct. 1988, pp. 99-106 [text only version].

Epstein et al., "Economical, High-Performance Optical Encoders," Hewlett-Packard Journal Oct. 1988, pp. 99-106.

Krishnan et al., "A Miniature Surface Mount Reflective Optical Shaft Encoder," Hewlett-Packard Journal, Dec. 1996, Article 8, pp. 1-6.

U.S. Appl. No. 13/796,502, filed Mar. 12, 2013, Leung et al.

U.S. Appl. No. 14/026,101, filed Sep. 13, 2013, Armstrong-Muntner.

U.S. Appl. No. 14/333,416, filed Jul. 16, 2014, Rothkopf et al.

U.S. Appl. No. 14/333,418, filed Jul. 16, 2014, Rothkopf et al.

U.S. Appl. No. 14/601,153, filed Jan. 20, 2015, Gowreesunker et al.

U.S. Appl. No. 14/796,915, filed Jul. 10, 2015, Gowreesunker et al.

DeskThorityNet, Optical Switch Keyboards, http://deskthority.net/keyboards-f2/optical-switch-keyboards-t1474.html, Jul. 11, 2015, 22 pages.

* cited by examiner

DEPRESSIBLE KEYS WITH DECOUPLED ELECTRICAL AND MECHANICAL FUNCTIONALITY

TECHNICAL FIELD

Embodiments described herein generally relate to depressible keys of a keyboard and, more particularly, to systems and methods for decoupling the mechanical and tactile functionality of depressible keys from the electrical functionality of depressible keys.

BACKGROUND

Conventional electronic devices can receive user input from a keyboard. Generally, each key of a keyboard incorporates a dedicated electromechanical actuator that guides the mechanical movement of the depressible key, provides a tactile feedback to the user, and completes an electrical circuit when the depressible key is pressed.

Typically, an electromechanical actuator is formed as a multi-part apparatus including a travel mechanism, a tactile feedback structure, a common contact, and a pair of electrical traces. In many cases, the travel mechanism can be implemented as a scissor or butterfly mechanism that is configured to collapse along an axis. The tactile feedback structure can be implemented as a compressible dome, made from a material such as metal, plastic, or an elastomer. The common contact can be implemented as an electrically conductive material such as metal or a metal-doped polymer. The pair of electrical traces may be disposed on a substrate positioned below a keycap.

For many conventional electromechanical actuators, the travel mechanism is coupled to and positioned centrally below the keycap, the tactile feedback structure is nested within the travel mechanism below the keycap, and the common contact is coupled to the feedback structure and positioned over the electrical traces. By applying a downward force to the keycap, the travel mechanism and tactile feedback structure temporarily deform and collapse, thereby wetting the common contact to the electrical traces so as to complete a circuit to indicate a depressible key press to the electronic device.

The components of a conventional electromechanical actuator are often specifically aligned to the geometric center of the keycap in order to provide a consistent and reliable electrical connection upon depression of the depressible key. One may appreciate therefore, that as a result of nesting and alignment, the dimensions of each component of the conventional electromechanical actuator may be limited, fixed, influenced, and/or defined by one or more dimensions of other components within the stack. For example, the electrical sensitivity of the depressible key may depend upon the overlapping surface area of the electrical contacts and the common contact, which in turn may depend upon the size of the tactile feedback structure, which in turn may depend upon the inner dimensions of the travel mechanism, which in turn may depend upon the dimensions of the keycap, which in turn may be defined by the size and shape of the keyboard.

Furthermore, certain users may prefer certain keyboards (and/or keys) to have specific electromechanical properties. For example, certain users may prefer to type with rigid and deep keys whereas other users may prefer to type with spongy and short keys.

However, customizing the typing experience of a keyboard for a particular user requires modification of multiple components of each electromechanical actuator specifically because the electrical, tactile, and mechanical functionality of the depressible key are tightly coupled and interdependent. For example, independently increasing the rigidity of the tactile feedback structure can affect the user's perception of both press sensitivity and key stiffness. As a result, enhancing and/or refining characteristics of the user's typing experience on a keyboard conventionally involves alteration of multiple materials, multiple structures, and multiple couplings which, in turn, increases the time and cost associated with research and development, prototyping, re-tooling, and manufacturing of keys and keyboards.

Accordingly, there may be a present need for systems and methods for decoupling the mechanical and tactile functionality of depressible keys from the electrical functionality of depressible keys.

SUMMARY

Embodiments described herein may relate to, include, or take the form of a keyboard including at least a plurality of keys, each key including at least a keycap with an optically reflective bottom surface, a travel mechanism coupled to the underside of the keycap, a tactile feedback structure nested within the travel mechanism and configured to collapse in response to a force applied to the keycap, and a non-contact proximity sensor. The non-contact proximity sensor can include at least a light emitter oriented to emit light toward the reflective bottom surface, and a light detector oriented to receive light reflected from the reflective bottom surface. Lastly, the keyboard can include a keyboard controller coupled each non-contact proximity sensor.

Some embodiments may include a configuration in which at least one light emitter may be configured to emit light in the infrared spectrum. Some embodiments may include a configuration in which at least one light emitter may be configured to emit light in the visible spectrum.

Some embodiments described herein may relate to, include, or take the form of a depressible key including at least a keycap with an optically reflective bottom surface, a travel mechanism coupled to the underside of the keycap, a tactile feedback structure configured to collapse in response to a force applied to the keycap, and an optical sensor including, in one embodiment, a light emitter oriented to emit light toward the reflective bottom surface, and a light detector oriented to receive light reflected from the reflective bottom surface. In other embodiments, the optical sensor can include only a light detecting element.

Some embodiments described herein may relate to, include, or take the form of a method of detecting a press of a depressible key, including at least the operations of illuminating an underside of a keycap associated with the depressible key with a selected wavelength of light, receiving an electrical signal corresponding to the amplitude of light reflected from the underside of the keycap, and determining whether a characteristic of the electrical signal passes a threshold test associated with a press of the key.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different figures indicates similar, related, or identical items.

DETAILED DESCRIPTION

Figure 1A:
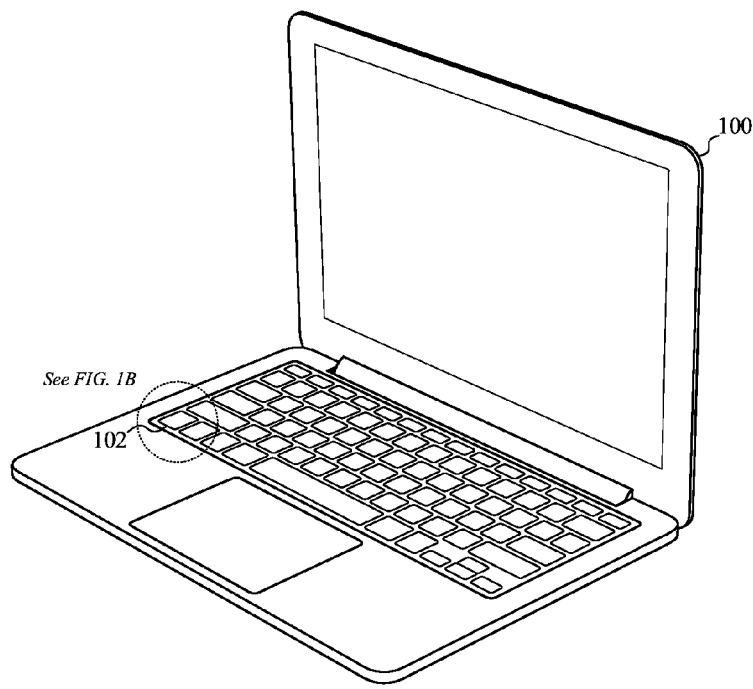
FIG. 1A depicts a perspective view of an electronic device incorporating a keyboard with multiple depressible keys with decoupled electrical and mechanical functionality.

Embodiments described herein relate to systems and methods for decoupling the electrical functionality (e.g., electrical indication of a depressible key press) from the mechanical functionality (e.g., tactile feel and mechanical translation) of depressible keys and/or buttons of a keyboard.

As noted above, it is often the case that the mechanical, material, electrical, and structural properties of the components a conventional electromechanical actuator of a key can inform a user's holistic perception and opinion of certain operational characteristics (e.g., flexibility, stickiness, snappiness, sponginess, stiffness, softness, sensitivity, rigidity, crispness, quality, responsiveness, durability, and so on) of an entire keyboard. However, as a result of dimensional constraints, alignment requirements, and/or various interdependencies of the electrical, tactile, and mechanical components of each electromechanical actuator, customizing the user experience of a particular keyboard typically requires modification of multiple (if not all) components of each electromechanical actuator.

For embodiments described herein, an electrical indication of a key press does not require mechanical closure of a physical switch, such as is the case for conventional electromechanical actuators. As a result, changes to the mechanical properties of keyboard embodiments described herein have substantially no effect on the electrical functionality thereof. Furthermore, decoupling the electrical functionality from the mechanical functionality of depressible keys removes alignment and dimensional requirements of the components providing the mechanical functionality of the key. In other words, embodiments described herein can provide customized mechanical and tactile responses using travel mechanisms and tactile feedback structures that need not be nested or aligned in any particular manner.

Many embodiments described herein decouple the electrical functionality and mechanical functionality of depressible keys by monitoring the output of a proximity sensor in communication with the depressible key in lieu of relying upon mechanical closure of a physical switch.

For example, certain embodiments described herein position a non-contact proximity sensor in communication with the underside of a keycap. When the keycap moves downwardly, the non-contact proximity sensor can detect the movement and, once it is determined that the keycap has moved beyond a certain threshold, the non-contact proximity sensor can report that the depressible key has been pressed by the user. For example, in many embodiments, the non-contact proximity sensor can report a depressible key press, either directly or indirectly, to an electronic device in communication therewith.

In many examples, the non-contact proximity sensor can be disposed immediately below the keycap. In other examples, the non-contact proximity sensor can be disposed elsewhere and can be placed in sensory communication with the keycap. For example, the non-contact proximity sensor can be disposed within the housing of the keyboard and/or within the housing of an electronic device, but not immediately below the keycap. In these examples, a single non-contact proximity sensor can be used with more than one keycap via coupling the non-contact proximity sensor to one or more multiplexors.

In many embodiments, the non-contact proximity sensor can be an optical sensor consisting of at least one light emitter and at least one light detector. In these examples, the optical sensor can be disposed below the keycap or, alternatively, can be coupled to one or more light guides that terminate proximate the keycap.

For embodiments in which the non-contact proximity sensor is implemented as an optical sensor, the light emitter of the optical sensor can illuminate the underside of the keycap and the light detector of the optical sensor can receive light reflected or refracted therefrom. By analyzing an electronic signal generated by the light detector in response to the received light, the optical sensor (or a processor coupled thereto) can determine whether the keycap is being pressed by a user. In many examples, the optical sensor can report that the keycap is being pressed upon determining that the magnitude of light received by the light detector has crossed a pre-determined threshold.

In some embodiments including an optical sensor, the light emitter can emit a directional beam of light that terminates either directly or indirectly at the light detector. As with some embodiments described herein, by analyzing the signal output from the light detector, the optical sensor can determine whether the keycap is being pressed by a user. In many examples, the optical sensor can report that the keycap is being pressed upon determining that the beam has been broken.

In many cases, the optical sensor can correlate the magnitude of light received by the light detector to a distance between the optical sensor and the underside of the keycap. For example, the more light received by the light detector, the closer the optical sensor and the keycap are determined to be. In these embodiments, the optical sensor can report that the keycap is being pressed upon determining that the distance between the optical sensor and the keycap has crossed a pre-determined threshold. In one example, the optical sensor can report that the keycap is being pressed once the depressible key has traveled at least three millimeters toward the optical sensor.

In still further examples, the optical sensor can correlate the rate of change in the magnitude of light received by the light detector to a velocity with which the keycap is moving. For example, the greater the rate of change in the magnitude of light received by the light detector, the faster the keycap can be determined to be moving, and thus the greater the velocity of the depressible key. In these embodiments, the optical sensor can report that the keycap is being pressed upon determining that the velocity of the keycap has crossed a pre-determined threshold.

In still further examples, the optical sensor can correlate a second order rate of change in the magnitude of light received by the light detector to an acceleration of the keycap. For example, the greater the second order rate of change in the magnitude of light received by the light detector, the greater the acceleration of the keycap. In these embodiments, the optical sensor can report that the keycap is being pressed upon determining that the acceleration of the keycap has crossed a pre-determined threshold.

In still further examples, the optical sensor can correlate the acceleration of the depressible key to an amount of force with which the depressible key is pressed. In these embodiments, the optical sensor can report that the keycap is being pressed upon determining that the force applied to the keycap has crossed a pre-determined threshold.

In some embodiments, more than one threshold can be used to determine whether a keycap is pressed. For example, an optical sensor can report that the keycap is being pressed upon determining that the force applied to the keycap has crossed a pre-determined threshold and that the distance between the optical sensor and the keycap has crossed a pre-determined threshold.

In some embodiments, a comparison between thresholds can be used to determine whether a keycap is pressed. For example, an optical sensor can report that the keycap is being pressed upon determining that the force applied to the keycap has crossed a pre-determined threshold or that the distance between the optical sensor and the keycap has crossed a pre-determined threshold.

In many embodiments, one or more pre-determined thresholds can be configured on a per-user basis. For example, the threshold magnitude of light received by the light detector, the threshold distance between the optical sensor and the keycap, the threshold velocity of the keycap, the threshold acceleration of the keycap, or the threshold force with which the keycap is pressed can vary from user to user.

In some embodiments, one or more pre-determined thresholds can be fixed values or, in some embodiments, one or more pre-determined thresholds can be values output from an equation, formula, or algorithm. In still further examples, one or more pre-determined thresholds can be obtained via one or more lookup tables. In other cases, one or more pre-determined thresholds can be obtained from a third party device or service.

In many embodiments, one or more pre-determined thresholds can be configured based on an instruction from a computing device coupled to the keyboard. For example, in the case that a keyboard is coupled to a personal computer, one or more pre-determined thresholds can be set based on an instruction from the personal computer.

For example, in one embodiment, a personal computer can adjust one or more thresholds for one or more keys based on an application or program operating on the personal computer at a particular time. In one embodiment, the threshold force with which the keycap is pressed may be different for certain keys when the personal computer is operating a word processing application than when the personal computer is operating a gaming application. For example, in some cases, a personal computer can lower one or more thresholds upon determining that a certain key or set of keys are more likely than others to be pressed in a particular application. Similarly, a personal computer can raise one or more thresholds upon determining that a certain key or set of keys are less likely than others to be pressed in a particular application. In one non-limiting example, a personal computer operating a word processing application can lower thresholds for alphanumeric keys, while increasing thresholds for function keys. In this example, a user of the keyboard is less likely to accidentally press one or more function keys because the threshold for pressing said keys is increased.

In some embodiments, a keyboard can provisionally report a depressible keypress to an electronic device prior to reporting a complete keypress to the electronic device. For example, as noted above, the keyboard may report a depressible keypress upon determining that one or more pre-determined thresholds are crossed. In these examples, a keyboard can provisionally report a depressible keypress upon determining that the output from the light detector of an optical sensor of particular key has not crossed the one or more pre-determined thresholds, but is nevertheless determined to be offset from a particular pre-determined baseline value. In other words, a provisional keypress report can indicate to an electronic device that a depressible key is in the process of being pressed. In these examples, an electronic device can submit provisional keypress reports to a text prediction, spelling, grammar, or other language or input interpretation engine.

In these embodiments, separation of the electrical and mechanical functionality of each depressible key can facilitate a measurable reduction in the time and cost of research and development, prototyping, re-tooling, and manufacturing of keys, keyboards, and associated input devices (of any size) by reducing the number of functional interdependencies between the electrical and mechanical components thereof. As one example, the tactile feel of the depressible key and the mechanical translation (together, the "mechanical" properties of a depressible key) of the depressible key can be developed and/or improved separately and independently from the electrical functionality of the depressible key.

It should be appreciated that the various embodiments described herein, as well as the functionality, operation, components, and capabilities thereof may be combined with other elements as necessary, and so any physical, functional, or operational discussion of any element or feature is not intended to limit solely to a particular embodiment to the exclusion of others or to favor a particular implementation for all embodiments. Particularly, although many embodiments are described herein with reference to depressible keys for keyboards and other input devices, other embodiments can take other forms and may be included within other electronic devices.

FIG. 1A depicts a perspective view of an electronic device 100 including a plurality of depressible keys having decoupled electrical and mechanical functionality. In some cases, all keys of the keyboard of the electronic device 100 can have decoupled electrical and mechanical functionality whereas in other cases, a subset of keys of the keyboard may have decoupled electrical and mechanical functionality.

In the illustrated embodiment, the electronic device 100 is implemented as a portable laptop computer. Some embodiments can implement the electronic device 100 differently. For example, the electronic device 100 can be implemented as a peripheral input device such as an external keyboard in certain embodiments.

The electronic device 100 can include within a housing a processor, a memory, a power supply and/or battery, network communications, touch sensors, input sensors, force sensors, environmental sensors, one or more display screens, acoustic elements, input/output ports, haptic elements, digital and/or analog circuitry for performing and/or coordinating tasks of the electronic device 100, and so on. In some examples, the electronic device 100 can communicate with a separate electronic device via one or more proprietary and/or standardized wired and/or wireless interfaces. For simplicity of illustration, the electronic device 100 is depicted in FIG. 1A without many of these elements, each of which may be included, partially, optionally, or entirely, within the housing.

Figure 1B:
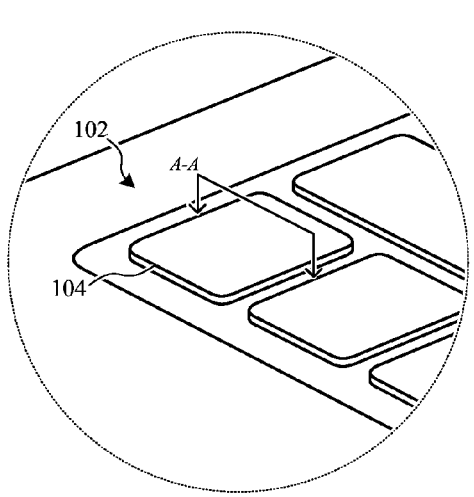
FIG. 1B depicts a detail view of a depressible key with decoupled electrical and mechanical functionality, for example as shown in FIG. 1A.

The electronic device 100 can also include a keyboard including several rows of depressible keys. FIG. 1B depicts a detail view of a depressible key 102 of the keyboard of the electronic device 100, illustrating a keycap 104 extending beyond the housing of the electronic device 100. In some embodiments, the keycap 104 can extend a greater distance than depicted. In Further embodiments, the keycap 104 can extend for a shorter distance than depicted. Although illustrated as including a substantially flat upper surface, other embodiments can implement the keycap 104 in other ways. For example, in some embodiments, the keycap 104 can have an concave upper surface.

Figure 1C:
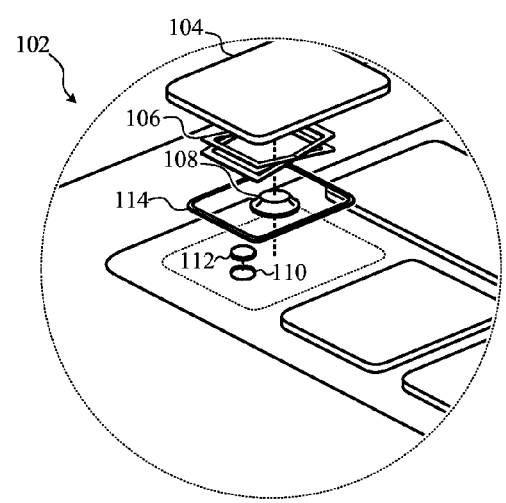
FIG. 1C depicts an exploded detail view of an example implementation of a depressible key that may be used with the keyboard depicted in FIGS. 1A-1B.

FIG. 1C depicts an exploded detail view of an example implementation of a depressible key 102 that may be used with the keyboard depicted in FIGS. 1A-1B. The example depicted can have decoupled electrical and mechanical functionality. The depressible key 102 can include a non-contact proximity sensor (not shown) to provide the electrical functionality of the key and a multi-part apparatus to provide the mechanical functionality of the key. As illustrated, the multi-part apparatus can include a keycap 104, a travel mechanism 106, and a tactile feedback structure 108.

In the example depicted in FIG. 1C, the keycap 104 can be movably supported by travel mechanism 106. In many embodiments, the travel mechanism 106 can be a scissor joint or a butterfly joint that is formed from two or more independent structures. In some cases, the independent structures can pivot with one another (e.g., the independent structures are coupled together at a central pivot point) or relative to one another (e.g., the independent structures are configured to slide against one another as the angle between the structures changes). In these examples the travel mechanism 106 can evenly translate pressure on the keycap 104 into a downward motion toward the housing of the electronic device 100. In many examples, the travel mechanism 106 can be configured to interlock with or otherwise couple to one or more features (not shown) of the housing of the electronic device 100.

The keycap 104 can also be supported by the tactile feedback structure 108. In many cases, the tactile feedback structure 108 can be formed into a deformable dome configured to collapse in response to a particular amount of downward force.

In some examples, the tactile feedback structure 108 can be formed from a material such as silicone, rubber, plastic, or polyester. In other examples, the tactile feedback structure 108 can be formed from other materials that are capable elastic deformation, such as metal.

The geometry of the tactile feedback structure 108 can vary from embodiment to embodiment. For example in a first embodiment, the tactile feedback structure 108 can be formed (as depicted) as a conical cylinder. In other examples, the tactile feedback structure 108 can be formed as a spherical or ellipsoidal cap. In other examples, tactile feedback structure 108 can be embodied as a series of multiple individual collapsible structures positioned adjacent to one other, in a pattern, or in a stack.

In still further examples, the tactile feedback structure 108 can be formed from an electroactive polymer or from a shape-memory metal such as Nitinol. In these examples, one or more properties (e.g., rigidity, flexibility) of the tactile feedback structure 108 can be adjusted by increasing a voltage applied through the tactile feedback structure 108.

In some cases, the material of the tactile feedback structure 108 can be doped with one or more agents. For example, a polymer can be doped with an agent configured to provide the polymer with a selected color, hardness, elasticity, stiffness, reflectivity, refractive pattern, texture and so on. In other examples, the doping agent can confer other properties to the polymer including, but not necessarily limited to, electrical conductivity and/or insulating properties, magnetic and/or diamagnetic properties, chemical resistance and/or reactivity properties, infrared and/or ultraviolet light absorption and/or reflectivity properties, visible light absorption and/or reflectivity properties, antimicrobial and/or antiviral properties, oleophobic and/or hydrophobic properties, thermal absorption properties, pest repellant properties, colorfast and/or anti-fade properties, deodorant properties, antistatic properties, liquid exposure reactivity properties, and so on.

In still further embodiments, the travel mechanism 106 and the tactile feedback structure 108 can be formed as a singular integral element. In these examples, the unified structure can be formed with one or more springs, low-durometer adhesives, elastomeric columns, and so on disposed below the keycap 104. In other examples, the unified structure can be formed into the keycap 104 itself.

In many embodiments, one or more properties of the travel mechanism 106 and the tactile feedback structure 108 can be modified to inform the user experience of depressing the depressible key 102.

For one non-limiting example, the elasticity of the tactile feedback structure 108 may contribute to inform the user's opinion of the "flexibility" of the depressible keys. In another non-limiting example, the stiffness of the travel mechanism 106 may contribute to inform the user's opinion of the "stiffness" of the depressible keys. In another non-limiting example, sounds generated by the travel mechanism 106 can contribute to inform the user's opinion of the "strength" and "durability" of the depressible keys. In another non-limiting example, sounds generated by the deformation of the tactile feedback structure 108 can contribute to inform the user's opinion of the "responsiveness" of the keyboard of the electronic device 100.

For example, a first user may favor a silent keyboard of the electronic device 100 that has a spongy and linear response when pressing a keycap 104 with a small amount of force through a short travel distance. A second user may prefer a loud keyboard of the electronic device 100 that has a springing and non-linear response when pressing a keycap 104 with a large amount of force through a long travel distance. In the first case, a spongy feel can be implemented for the first user by reducing the rigidity of the tactile feedback structure 108. On the other hand, a springing and non-linear feel can be implemented for the second user by causing the travel mechanism 106 to buckle when pressed beyond a breakpoint.

As noted above, the mechanical and tactile functionality of the depressible key 102 may be decoupled from the electrical functionality of the depressible key 102. For example, the electrical functionality of the depressible key 102 can be provided by disposing a non-contact proximity sensor within the housing of the electronic device 100. The non-contact proximity sensor can be placed in communication with the underside of the keycap 104 such that when the keycap 104 moves downwardly, the non-contact proximity sensor can detect the movement and, once it is determined that the keycap 104 has moved beyond a certain threshold, the non-contact proximity sensor can report that the depressible key 102 has been pressed by the user. For example, in many embodiments, the non-contact proximity sensor can report a depressible key press to the electronic device 100.

In many examples, the non-contact proximity sensor can be disposed immediately below the keycap. In other examples, the non-contact proximity sensor can be disposed elsewhere and can be placed in sensory communication with the keycap. For example, the non-contact proximity sensor can be disposed within the housing of the electronic device 100, but not immediately below the keycap. In these examples, a single non-contact proximity sensor can be used with more than one keycap via coupling the non-contact proximity sensor to one or more multiplexors.

In one non-limiting embodiment, the non-contact proximity sensor can be implemented as an optical sensor consisting of at least one light emitter (not shown) and at least one light detector (not shown). In certain embodiments, the light emitter may include (or be coupled to a light emitter such as) an organic light-emitting diode ("OLED"), a semiconductor-based light-emitting diode ("LED") or any other suitable light source. In some embodiments, the light emitter may be configured to emit light in an invisible spectrum such as infrared. In other examples, the light emitter may be configured to emit light in a visible spectrum, such as white light. In some examples, the light emitter may be configured to emit light in a selectable spectrum, emitting infrared light in a first mode and emitting visible light of a selected color and brightness in a second mode.

In one embodiment light emitter of the optical sensor can illuminate the underside of the keycap through an aperture 110 in the housing of the electronic device 100. In many examples, the aperture 110 can be sealed with a cover 112. In some cases, the lens can be made from a rigid and optically transparent material such as plastic, glass or sapphire. Although illustrated as a flat, circular, disk-shaped lens, the cover 112 can be formed into other shapes in other embodiments. For example, in some embodiments, the cover 112 can be formed with a Fresnel pattern or may be otherwise shaped to convey particular optical properties. In some embodiments the cover 112 can be made from an optically translucent material. In some examples, the cover 112 can affect the path of light therethrough. For example in some examples, the cover 112 can be formed as a lens in order to focus light emitted from the light emitter or in order to focus light reflected from the underside of the keycap onto the light collector.

In these embodiments, the housing of the electronic device 100 can be sealed below the keyboard. In these cases, the electronic device 100 can have increased resistance to accidental liquid spillage and/or accidental ingress of foreign matter (e.g., dust particles, food particles, dirt particles, and so on) into the housing of the electronic device 100.

Once light from the light emitter passes through the cover 112, the light may reflect off one or more portions of the depressible key 102. For example in one embodiment, light can reflect off the travel mechanism 106, the tactile feedback structure 108, and/or the underside of the keycap 104. In some cases, the underside of the keycap 104 can be optically reflective. For example, in some cases, the optically reflective portion of the keycap 104 can be implemented as a reflective material disposed on, adhered to, or molded within or into the keycap 104. In one embodiment, the reflective material may be a polished metal, glass, crystal, ceramic, or plastic material. In another embodiment, the reflective surface can be an optical minor. In other examples, the underside of the keycap 104 can be treated so as to be optically reflective. For example, in one embodiment the underside of the keycap 104 can be polished. In many cases, the optically reflective portion of the keycap 104 can encompasses entire underside of the keycap 104. In other examples, the optically reflective portion of the keycap 104 can encompass only a portion of the underside of the keycap 104.

In this manner, once light from the light emitter passes through the cover 112 and reflects off the optically reflective portion(s) of the depressible key 102, the reflected light can pass once more through the cover 112 to be received by the light detector of the optical sensor. By analyzing an electronic signal generated by the light detector in response to the received light, the optical sensor (or a processor associated with the electronic device 100) can determine whether the keycap 104 is being pressed by a user. In many examples, the optical sensor can report that the keycap 104 is being pressed upon determining that the magnitude of light received by the light detector has crossed a predetermined threshold.

In some embodiments, the downward travel of the keycap 104 can be limited by a damper cushion 114. As illustrated, the damper cushion 114 can be implemented as a foam ring seal that is disposed on the exterior surface of the housing of the electronic device 100. The damper cushion 114 can be positioned and oriented such that the keycap 104 impacts the damper cushion 114 prior to impacting the top surface of the housing of the electronic device 100. In some examples, the damper cushion 114 can be formed form an elastomer, polymer, or other resilient or semi-resilient material. In many cases, the height of the damper cushion 114 can at least partially define the travel of the keycap 104 during a press.

Although illustrated as a contiguous ring substantially following the perimeter geometry of the keycap 104, the damper cushion 114 can take other shapes in some embodiments and can be distributed into more than one component in some embodiments. For example, in some embodiments, the damper cushion 114 can be implemented as four cushions positioned below the corners of the keycap 104. In other examples, the damper cushion 114 can be implemented as parallel cushions disposed below opposite edges of the keycap 104.

In many embodiments, the damper cushion 114 can be adhered to the top surface of the housing of the electronic device 100. In some examples, the adhesive may be a pressure sensitive adhesive. In other cases, the damper cushion 114 can be formed directly onto the housing of the electronic device 100. In still further examples, the damper cushion 114 can be welded (e.g., sonic welded) onto the housing of the electronic device 100.

In some embodiments, the damper cushion 114 can be disposed within a recessed groove (not shown) formed into the housing of the electronic device 100.

In some embodiments, the damper cushion 114 can be formed from the same material as the housing (or a layer of the housing) of the electronic device 100. For example, in some embodiments, the housing of the electronic device 100 can be formed from a plastic material. In these embodiments, the damper cushion 114 can be molded or stamped into the housing of the electronic device 100.

In some embodiments, the damper cushion 114 can be formed onto protruding geometry of the housing of the electronic device 100. For example, in some cases the housing of the electronic device 100 can be formed from a metal such as aluminum. In this case, a protruding feature or embossment can be formed, molded, stamped or welded onto the housing of the electronic device 100. Thereafter, a cushioning material such as foam or an elastomer can be disposed onto the embossment. In some examples, the cushioning material can be adhered to the embossment, in some embodiments the cushioning material can be painted and or otherwise disposed onto the embossment. In other examples, more than one embossment can be formed onto the surface of the housing of the electronic device 100.

As can be appreciated, the amount of cushion and/or compressibility of the damper cushion 114 can vary from embodiment to embodiment.

As illustrated, the mechanical components of the depressible key 102 depicted in FIG. 1C, including the travel mechanism 106 and the tactile feedback structure 108, may be aligned with the geometric center of the keycap 104. In many cases, this alignment can facilitate a substantially uniform downward travel of the keycap 104 during a press. In other cases, however, the travel mechanism 106 and the tactile feedback structure 108 can be aligned in other fashions.

In many embodiments the keycap 104 can include a legend area (not shown) onto and/or into which a legend can be disposed, etched, embossed, inset, and so on. The legend may take the form of any numeral, symbol or letter of any language suited to the electronic device 100. For example, the legend may be one or more English letters or symbols in one embodiment, or the legend may be one or more simplified Chinese characters. In further embodiments, the legend may take the form of a function symbol such as a power symbol, an eject symbol, or a play/pause symbol. In some embodiments, a legend may include any symbol, character, glyph, letter, artwork or other information-conveying image.

In some examples, the legend area of the keycap 104 that can be illuminated to enable a user to operate the depressible key 102 in low light conditions. In these examples, the legend area may be formed form a light-diffusive material. In one embodiment, a backlight source can be positioned below or adjacent the underside of the keycap 104 so as to transmit light through the legend area. In certain embodiments, the backlight source (not shown) may include (or be coupled to a backlight source such as) an OLED, LED, or any other suitable light source.

In a further embodiment, the backlight source may be positioned to transmit light around the perimeter of the keycap 104. In this way, when viewing the keycap 104 from above, the perimeter of the depressible key 102 may appear illuminated.

In further embodiments, the light emitter associated with the optical sensor disposed within the housing of the electronic device 100 can be used to provide backlight illumination to the depressible key 102.

Figure 2A:
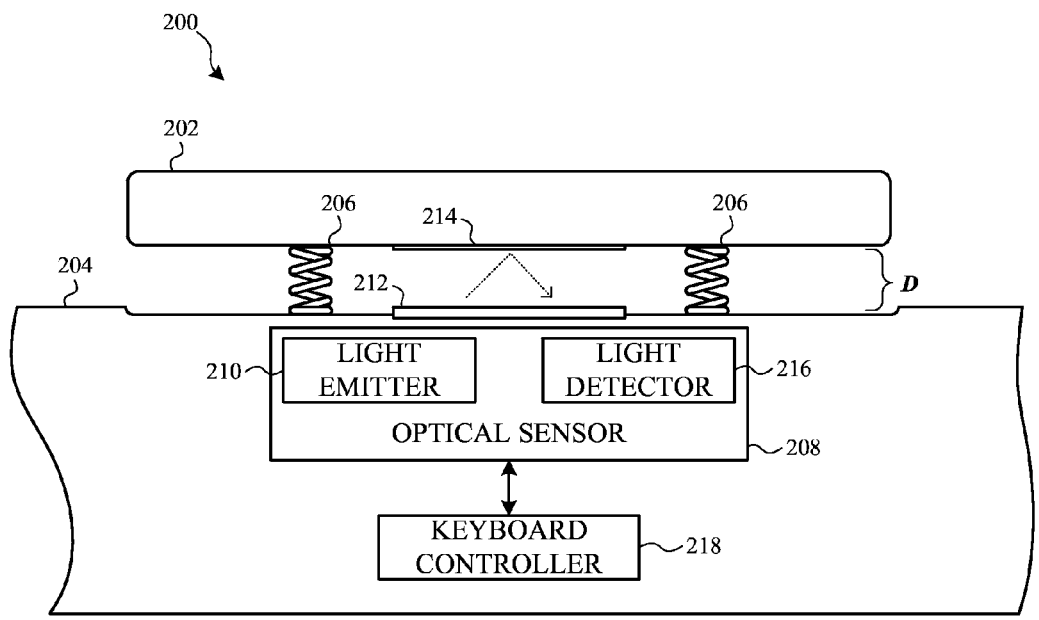
FIG. 2A depicts a simplified cross-section, taken along line A-A of FIG. 1B, and signal flow diagram of an example implementation of a depressible key with decoupled electrical and mechanical functionality that may be used, in one example, with the keyboard depicted in FIGS. 1A-1B.

FIG. 2A depicts a simplified cross-section, taken along line A-A of FIG. 1B, and signal flow diagram of an example implementation of a depressible key 200 with decoupled electrical and mechanical functionality that may be used, in one example, with the keyboard depicted in FIGS. 1A-1B. The depressible key 200, as depicted, can include a keycap 202 that extends a certain distance D above the surface of a housing 204. As with some embodiments described herein, the housing 204 can be associated with an electronic device, such as the electronic device 100 depicted in FIGS. 1A-1C.

The depressible key 200 can be mechanically supported accordance with some embodiments described herein. For example, as noted above, the depressible key 200 can be supported by a travel mechanism and a tactile feedback structure. As with some embodiments described herein, the support structure of the depressible key 200 can vary from embodiment to embodiment. For example in one embodiment a travel mechanism can be implemented as a butterfly joint or a scissor joint and a tactile feedback structure can be implemented as an elastomeric dome. In some embodiments the support structure of the depressible key 200 can take other forms. Accordingly, for simplicity of illustration, all components or elements associated with the mechanical (and tactile) features and functionality of particular implementations of the depressible key 200 are collectively represented as the mechanical support structure 206, depicted in FIG. 2A as a pair of springs.

The depressible key 200 can also include a non-contact proximity sensor implemented as an optical sensor 208. In many embodiments, the optical sensor 208 can include a light emitter 210 and a light detector 216, depicted within the left and right portions of the optical sensor 208, respectively (although this layout is not required).

In many embodiments, the light emitter 210 may include an organic light-emitting diode ("OLED"), a semiconductor-based light-emitting diode ("LED") or any other suitable light source. In some embodiments, the light emitter 210 may be configured to emit light in an invisible spectrum such as infrared. In other examples, the light emitter 210 may be configured to emit light in a visible spectrum, such as white light. In some examples, the light emitter 210 may be configured to emit light in a selectable spectrum, emitting infrared light in a first mode and emitting visible light of a selected color and brightness in a second mode. In many cases, the optical sensor 208 can control the mode of the light emitter 210.

In one embodiment light emitter 210 of the optical sensor 208 can illuminate the underside of the keycap 202 through an aperture in the housing 204. In many examples, the aperture can be sealed with a cover 212. In some cases, the cover 212 can be made from a rigid and optically transparent material such as plastic, glass or sapphire. In some embodiments, the cover 212 can affect one or more optical properties of the light passing therethrough. For example, in some embodiments, the cover 212 can focus, diffuse, or filter the light passing therethrough.

Once light from the light emitter 210 passes through the cover 212, the light may reflect off one or more portions of the keycap 202. For example in one embodiment, light can reflect off one or more portions of the mechanical support structure 206. In other cases, the underside of the keycap 202 can be optically reflective. For example, in some cases, the keycap 202 can be implemented with an optical reflector 214 formed from a reflective material disposed on, adhered to, or molded within or into the keycap 202. In one embodiment, the optical reflector 214 may be a polished metal, glass, crystal, ceramic, or plastic material. In another embodiment, the optical reflector 214 can be an optical mirror. In other examples, the underside of the keycap 202 can be treated so as to be optically reflective. For example, in one embodiment the underside of the keycap 202 can be polished. In many cases, the optical reflector 214 can encompasses entire underside of the keycap 202. In other examples, the optical reflector 214 can encompass only a portion of the underside of the keycap 202.

Figure 2B:
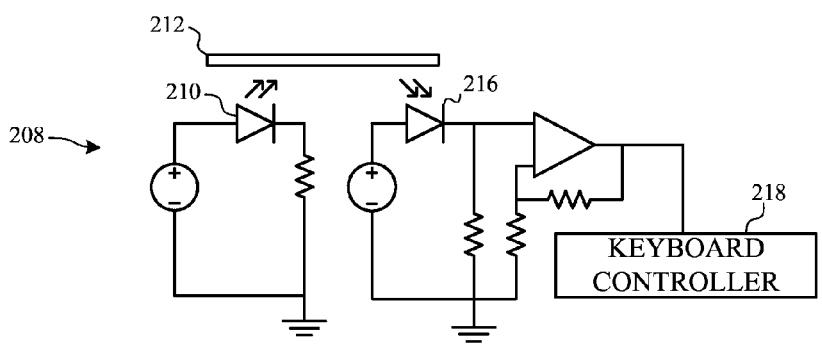
FIG. 2B depicts a simplified schematic view of a non-contact proximity sensor that may be used with a depressible key having decoupled electrical and mechanical functionality.

Once light from the light emitter passes through the cover 212 and reflects off the optical reflector 214 of the keycap 202, the reflected light can pass once more through the cover 212 to be received by the light detector 216. In some examples, the optical sensor 208 can be implemented with a circuit topology similar to the simplified schematic depicted in FIG. 2B, showing a two-part electrical schematic diagram. However one may appreciate that the illustrated circuit topology is provided only as an example, and that other circuit topologies may be favored in some embodiments. As illustrated in FIG. 2B, the light emitting portion of the optical sensor 208 can include a voltage source and a light emitter 210 and the light detecting portion of the optical sensor 208 can include a voltage source and a light detector 216. In many embodiments, the output from the light detector 216 can be amplified prior to being processed by a keyboard controller 218.

By analyzing an electronic signal generated by the light detector 216 in response to the received light, the keyboard controller 218 can determine whether the keycap 202 is being pressed by a user. In many examples, the keyboard controller 218 can report that the keycap 202 is being pressed upon determining that the magnitude of light received by the light detector has crossed a pre-determined threshold.

For example, in some cases, the electronic signal generated by the light detector 216 can be a voltage signal. In these embodiments, the keyboard controller 218 can monitor for variance in the voltage of the electronic signal generated by the light detector 216 that result from the downward motion of the keycap 202. For example, in some embodiments, as the keycap 202 moves downwardly, the amount of light reflected from the keycap 202 and detected by the light detector 216 can increase. Correspondingly, the electronic signal generated by the light detector 216 can exhibit an increase in voltage. In other embodiments, as the keycap 202 moves downwardly, the amount of light reflected from the keycap 202 and detected by the light detector 216 can decrease. For example, in some embodiments, the light detector 216 may be separated from the light emitter 210 by one or more optical barriers. In this manner, as the keycap 202 moves closer to the optical barrier, the amount of light reflected off the keycap 202 and over the optical barrier can decrease.

In some embodiments, the change in voltage of the electronic signal generated by the light detector 216 can be linear with respect to the position of the keycap 202. In other examples, the change in the voltage of the electronic signal generated by the light detector 216 can be non-linear with respect to the position of the keycap 202.

In other cases, the electronic signal generated by the light detector 216 can be a current signal. In these embodiments, the keyboard controller 218 can monitor for variance in the current of the electronic signal generated by the light detector 216 that result from the downward motion of the keycap 202. For example, in some embodiments, as the keycap 202 moves downwardly, the amount of light reflected from the keycap 202 and detected by the light detector 216 can increase. Correspondingly, the electronic signal generated by the light detector 216 can exhibit an increase in current. In other embodiments, the current of the electronic signal generated by the light detector 216 can vary in other ways.

In some embodiments, the electronic signal generated by the light detector 216 can be a periodic signal. For example, in some cases, the light emitter 210 can emit a signal whose amplitude or color vary with time in a given pattern. For example, in some cases, the light emitter can emit light with a sinusoidally-varying brightness. Accordingly, the reflection received by the light detector 216 may also be substantially sinusoidal. In these embodiments, the keyboard controller 218 can monitor for variance in the periodicity of the electronic signal generated by the light detector 216 that result from the downward motion of the keycap 202. For example, in some cases, the keyboard controller 218 can monitor the phase of the periodic signal. In other embodiments, the keyboard controller can monitor the phase difference of the periodic signal received by the light detector 216 and the periodic signal generated by the light emitter 210. In other examples, other characteristics of the periodic signal can be monitored by the keyboard controller.

In some embodiments, the electronic signal generated by the light detector 216 can be a polarized signal. For example, in some cases, the light emitter 210 can emit light with a certain polarity. In many cases, the polarity of light may be impacted by reflection from a surface. Accordingly, the reflection received by the light detector 216 may be polarized to a different degree than the light emitted from the light detector 216. In these embodiments, the keyboard controller 218 can monitor for variance in the polarity of the electronic signal generated by the light detector 216 that result from the downward motion of the keycap 202.

In still further embodiments, the electronic signal monitored by the keyboard controller 218 can be obtained from more than one light detector. In these embodiments, the several light detectors can be arranged at different locations such that each light detector receives light reflected from the keycap 202 at a different angle. In these embodiments, the keyboard controller 218 can determine common or differential properties between the light detectors.

In other embodiments, the reflective surface off which the light generated by the light emitter 210 can include an iridescent pattern, grating, or other reflective characteristic that causes the optical characteristics of light to change given different incident angles of incoming light. In these examples, the color and/or amplitude of light reflected from the keycap can vary with the translation of the keycap downward. In these examples, the keyboard controller 218 can monitor the brightness, color, distortion, or clarity of the reflected pattern to determine the location of the keycap.

In other examples, the optical sensor can be implemented with an image detector, instead of or in addition to, the light detector. For example, an image detector can be a camera element such as a charge-coupled device or a CMOS image sensor. In these examples, the keyboard controller 218 can monitor the image output by the image detector in order to determine the location of the keycap. For example, in one embodiment, the keyboard controller 218 can determine the current and/or optimal focus point of the image detector. In other examples, the keyboard controller can determine the relative location of one or more features of the underside of the keycap.

As noted above, although depicted in FIG. 2B as a two-part simplified electrical schematic diagram, the optical sensor 208 can take other circuit topologies. For example, in another embodiment, the light emitter and the light detector of the optical sensor 208 can be implemented with a single element. In this example, a photo diode can be alternated, rapidly, between an emitting mode and a detecting mode.

As illustrated, the non-contact proximity sensor (e.g., the optical sensor 208) is disposed immediately below the keycap 202. Although as illustrated, the non-contact proximity sensor is positioned generally in the center of the keycap 202, such a configuration is not required for all embodiments. For example, in some embodiments, the non-contact proximity sensor can be positioned along one corner of the keycap 202. In another example, more than one non-contact proximity sensor can be disposed generally beneath the keycap 202. In these examples, the output from the multiple non-contact proximity sensors can be compared or combined.

Figure 2C:
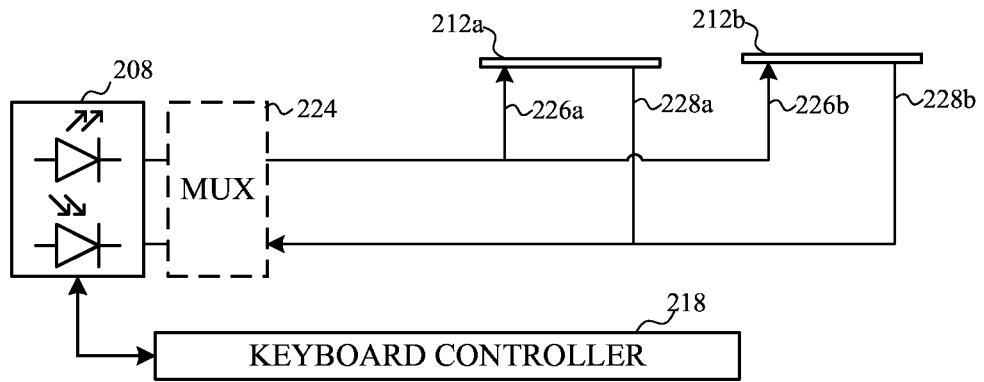
FIG. 2C depicts another simplified schematic view of a non-contact proximity sensor that may be used with a depressible key having decoupled electrical and mechanical functionality.

In other examples, such as shown in FIG. 2C, the non-contact proximity sensor can be disposed elsewhere and can be placed in sensory communication with the keycap 202. For example, the non-contact proximity sensor can be disposed within the housing of the keyboard, but not immediately below the keycap. In these examples, a single non-contact proximity sensor can be used with more than one keycap via coupling the non-contact proximity sensor to a multiplexor 224. For example, the multiplexor 224 can selectively couple the optical sensor 208 to the light guides 226a, 226b and 228a, 228b, which can terminate, respectively, below the keycaps 202a, 202b.

Figure 2D:
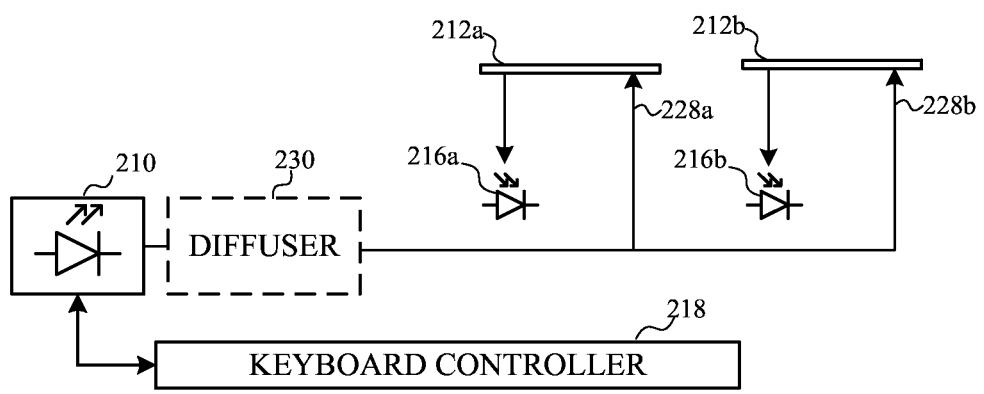
FIG. 2D depicts another simplified schematic view of a non-contact proximity sensor that may be used with a depressible key having decoupled electrical and mechanical functionality.
Figure 3A:
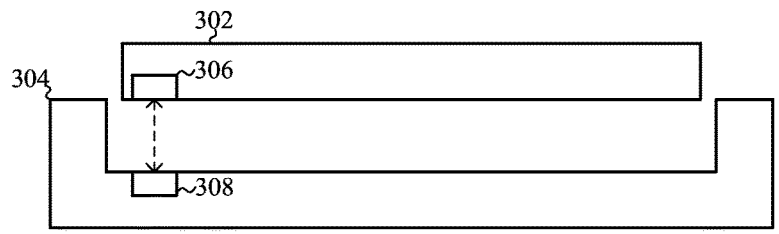
FIG. 3A depicts a simplified cross-section view, taken along line A-A of FIG. 1B, of another example depressible key with decoupled electrical and mechanical functionality.

In still other examples, such as shown in FIG. 2D, the optical sensor can be partially disposed below the keycap 202 and partially disposed elsewhere. For example, a light detector associated with the optical sensor can be disposed immediately below the keycap 202 while the light emitter associated with the optical sensor can be disposed elsewhere. In this manner, a light emitter can illuminate the underside of more than one keycap via coupling the light emitter to a diffuser 230. In some examples, the diffuser 230 can take the form of a light guide, light panel, optical fiber, light distributor, optical router or any other suitable active or passive element or cooperation of elements. FIG. 3A depicts a simplified cross-section view of another example depressible key. The depressible key can include a keycap which is configured to depress a certain distance into a housing 304. As with some embodiments described herein the depressible key is depicted, for simplicity of illustration, without mechanical components configured for providing to a user a guided translation of the keycap and a particular tactile feedback during a keypress.

The depressible key can include one or more non-contact proximity sensors, implemented as an optical sensor having a light emitter 306 and a light detector 308. As depicted, the light emitter 306 can be positioned within the housing 304 and the light detector 308 can be positioned within the keycap 302. In this embodiment, the light emitter 306 can be vertically aligned with the light detector 308.

By analyzing an electronic signal generated by the light detector 308 in response to the received light, the optical sensor (or a processor or electronic device coupled thereto) can determine whether the keycap 302 is being pressed by a user. In many examples, the optical sensor can report that the keycap 302 is being pressed upon determining that the magnitude of light (e.g., amplitude) received by the light detector 308 has crossed or otherwise exceeds a pre-determined threshold. In some cases, the pre-determined threshold can be a descending-value threshold, and in other cases the pre-determined threshold can be ascending-value threshold.

In many cases, the optical sensor can correlate the magnitude of light received by the light detector 308 to a distance between the optical sensor and the underside of the keycap 302. For example, the more light received by the light detector 308, the closer the optical sensor and the keycap 302 are determined to be. In these embodiments, the optical sensor can report that the keycap 302 is being pressed upon determining that the distance between the optical sensor and the keycap 302 has crossed a pre-determined threshold. In one example, the optical sensor can report that the keycap 302 is being pressed once the depressible key has traveled at least three millimeters toward the optical sensor.

Similarly, the optical sensor can correlate the rate of change in the magnitude of light received by the light detector 308 to a velocity, an acceleration, a force, or any combination thereof. In some embodiments, more than one threshold can be used to determine whether a keycap 302 is pressed. For example, an optical sensor can report that the keycap 302 is being pressed upon determining that the force applied to the keycap 302 has crossed a pre-determined threshold and that the distance between the optical sensor and the keycap 302 has crossed a pre-determined threshold.

In some embodiments, a comparison between thresholds can be used to determine whether a keycap 302 is pressed. For example, an optical sensor can report that the keycap 302 is being pressed upon determining that the force applied to the keycap 302 has crossed a pre-determined threshold or that the distance between the optical sensor and the keycap 302 has crossed a pre-determined threshold.

In many embodiments, one or more pre-determined thresholds can be configured on a per-user basis. For example, the threshold magnitude of light received by the light detector 308, the threshold distance between the optical sensor and the keycap 302, the threshold velocity of the keycap 302, the threshold acceleration of the keycap 302, or the threshold force with which the keycap 302 is pressed can vary from user to user.

In some embodiments, one or more pre-determined thresholds can be fixed values or, in some embodiments, one or more pre-determined thresholds can be values output from an equation, formula, or algorithm. In still further examples, one or more pre-determined thresholds can be obtained via one or more lookup tables. In other cases, one or more pre-determined thresholds can be obtained from a third party device or service.

Figure 3B:
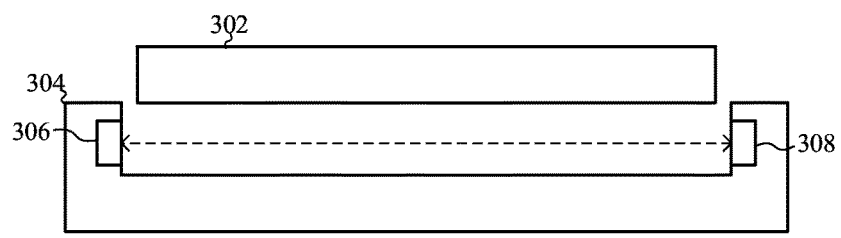
FIG. 3B depicts a simplified cross-section view, taken along line A-A of FIG. 1B, of another example depressible key with decoupled electrical and mechanical functionality.

In some embodiments, such as depicted in FIG. 3B, the light emitter 306 can emit a directional beam of light that terminates either directly or indirectly at the light detector 308. As with some embodiments described herein, by analyzing the signal output from the light detector, the optical sensor can determine whether the keycap is being pressed by a user. In many examples, the optical sensor can report that the keycap is being pressed upon determining that the beam has been broken.

Figure 3C:
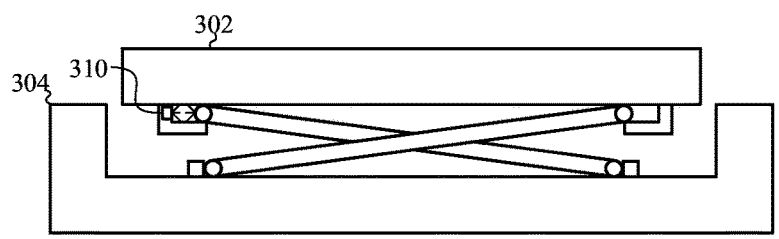
FIG. 3C depicts a simplified cross-section view, taken along line A-A of FIG. 1B, of another example depressible key with decoupled electrical and mechanical functionality.

In some embodiments, such as depicted in FIG. 3C, the optical sensor 310 can be positioned to measure a change in the relative position of a mechanical portion of the depressible key. For example, as illustrated, the optical sensor 310 can be positioned in sensory communication with a sliding portion of a translation mechanism such as a butterfly mechanism. As the depressible key moves downwardly, the distance between the optical sensor 310 and the translation mechanism can decrease. As with some embodiments described herein, by analyzing the signal output from the light detector of the optical sensor, the optical sensor can determine whether the keycap is being pressed by a user.

Figure 3D:
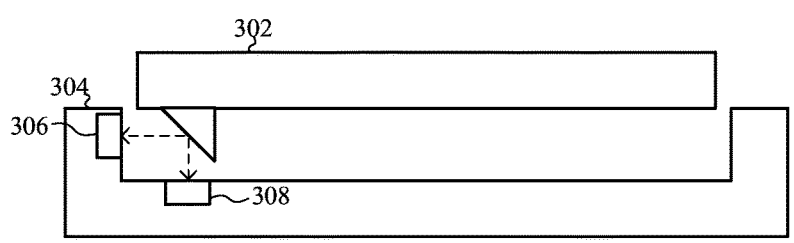
FIG. 3D depicts a simplified cross-section view, taken along line A-A of FIG. 1B, of another example depressible key with decoupled electrical and mechanical functionality.
Figure 3E:
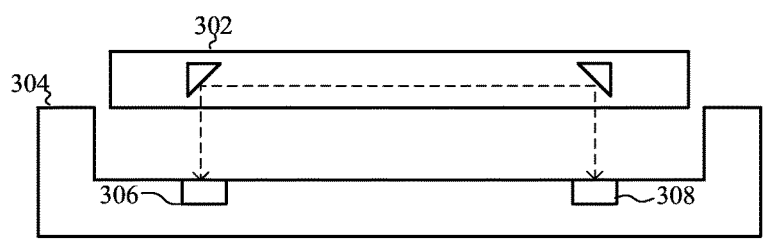
FIG. 3E depicts a simplified cross-section view, taken along line A-A of FIG. 1B, of another example depressible key with decoupled electrical and mechanical functionality.

In some embodiments, such as depicted in FIG. 3D-3E, the optical sensor 310 can be positioned to measure a change in the relative position of a mechanical portion of the depressible key. For example, as illustrated, the light emitter 306 can be indirectly in communication with the light detector 308. For example, as illustrated, the light emitted from the light emitter can be reflected off one or more reflective surface (e.g., mirrors) prior to being received by the light detector 308. As with some embodiments described herein, by analyzing the signal output from the light detector of the optical sensor, the optical sensor can determine whether the keycap is being pressed by a user.

Figure 4A:
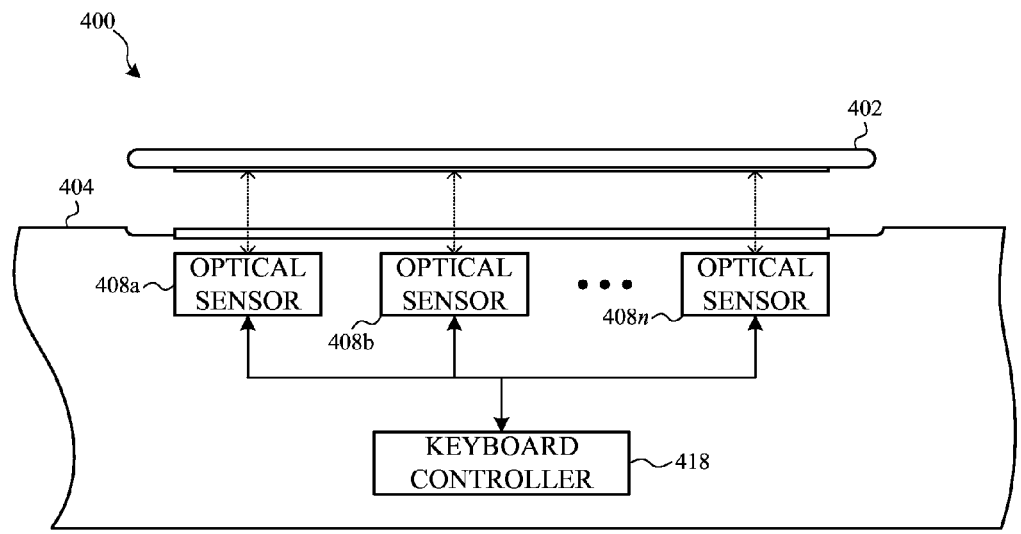
FIG. 4A depicts a simplified cross-section, taken along line A-A of FIG. 1B, and signal flow diagram of an example implementation of a user-depressible surface (e.g., keycap, trackpad, etc.) with decoupled electrical and mechanical functionality.

FIG. 4A depicts an example implementation of a depressible surface 400 with decoupled electrical and mechanical functionality.

Figure 4B:
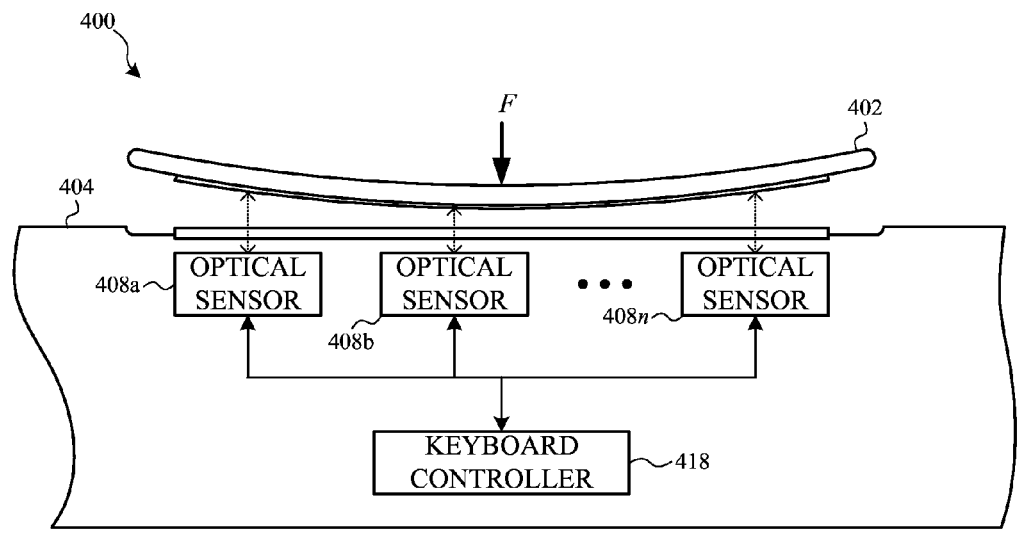
FIG. 4B depicts the depressible surface of FIG. 4A, showing an exaggerated deformation of the keycap that may result from a localized application of force.

The depressible surface 400 can be mechanically supported accordance with some embodiments described herein. In other cases, the depressible surface 400 can be rigidly supported along its edges, corners, and/or entire perimeter such that the depressible surface 400 can bend or deflect in response to receiving a downward force at the top surface 402 (see, e.g., FIG. 4B). As with other embodiments described and depicted herein, the supports that can be provided with various implementations of the embodiments depicted and described with reference to FIG. 4B are omitted from FIG. 4A-4B for clarity.

For example, the depressible surface 400 can be supported by a travel mechanism and a tactile feedback structure. As with other embodiments described herein, the support structure associated with the depressible surface 400 can vary from embodiment to embodiment. For example in one embodiment a travel mechanism can be implemented as a butterfly joint or a scissor joint and a tactile feedback structure can be implemented as an elastomeric dome. In some embodiments the support structure of the depressible surface 400 can take other forms. Accordingly, for simplicity of illustration, components and elements associated with the mechanical (and tactile) features and functionality of particular implementations of the depressible surface 400 are not depicted.

The depressible surface 400 can also include a number of non-contact proximity sensors implemented as the optical sensors 408*a* through 408*n*. One may appreciate that in other embodiments, a greater or fewer number of optical sensors can be included. Further, although the optical sensors illustrated in FIGS. 4A-4B are depicted as evenly distributed below the top surface 402, such a configuration is not required in all embodiments. For example, in some embodiments, the optical sensors can be distributed below the top surface 402 in two dimensions (e.g., a matrix, array, spiral, or other pattern or distribution).

In many embodiments, each optical sensor 408*a*-408*n* can include one or more light emitters and one or more light detectors.

As with other embodiments described herein, the one or more light emitters of each optical sensor may be configured to emit light in an invisible spectrum such as infrared. In other examples, the one or more light emitters of each optical sensor may be configured to emit light in a visible spectrum, such as white light. In some examples, the one or more light emitters of each optical sensor may be configured to emit light in a selectable spectrum, emitting infrared light in a first mode and emitting visible light of a selected color and brightness in a second mode. In many cases, each optical sensor 408*a*-408*n* can control the mode of the one or more light emitters of each optical sensor.

In one embodiment, one or more light emitter of each optical sensor 408*a*-408*n* can illuminate the underside of the top surface 402 through an aperture in the housing 404. In many examples, the aperture can be sealed with a cover. In some cases, the cover can be made from a rigid and optically transparent material such as plastic, glass or sapphire. In some embodiments, the cover can affect one or more optical properties of the light passing therethrough. For example, in some embodiments, the cover can focus, diffuse, or filter the light passing therethrough.

Once light from the one or more light emitters of each optical sensor passes through the cover, the light may reflect off one or more portions of the top surface 402. For example in one embodiment, light can reflect off one or more portions of a mechanical support structure. In other cases, the underside of the top surface 402 can be optically reflective. For example, in some cases, the top surface 402 can be implemented with an optical reflector formed from a reflective material disposed on, adhered to, or molded within or into the top surface 402. In one embodiment, the optical reflector may be a polished metal, glass, crystal, ceramic, or plastic material. In another embodiment, the optical reflector can be an optical minor. In other examples, the underside of the top surface 402 can be treated so as to be optically reflective. For example, in one embodiment the underside of the top surface 402 can be polished. In many cases, the optical reflector can encompasses entire underside of the top surface 402. In other examples, the optical reflector can encompass only a portion of the underside of the top surface 402.

Once light from the light emitter passes through the cover and reflects off the optical reflector of the top surface 402, the reflected light can pass once more through the cover to be received by one or more light detector. In some examples, each optical sensor 408*a*-408*n* can be implemented with a circuit topology similar to the simplified schematic depicted in FIG. 2B, showing a two-part electrical schematic diagram.

By analyzing an electronic signal generated by each of the one or more light detectors in response to the received light, a sensor controller 418 can determine whether the top surface 402 is being pressed by a user. Further, by comparing the electronic signal generated by each of the one or more light detectors, the sensor controller 418 can determine whether the top surface is experiencing deflection. For example, as depicted in FIG. 4B, a deflection may be detected by the sensor controller 418 by comparing electronic signals generated by the optical sensor 408a to the electronic signals generated by the optical sensor 408b. More particularly, the optical sensor 408b may output an electronic signal with an amplitude that is greater than the electronic signal generated by the optical sensor 408a. In other examples, other characteristics of the electronic signals apart from or in addition to amplitude can be considered by the sensor controller 418 including, but not limited to, phase, frequency spectrum, voltage, current, and so on.

In further embodiments, the sensor controller 418 can compile the electronic signals generated by each of the one or more light detectors into an elevation map of the deflection of the top surface 402. In some embodiments, the elevation map can be used to approximate a location and an amount of force being applied to the top surface 402 (see, e.g., FIG. 4B).

In other examples, the sensor controller 418 can report that the top surface 402 is being pressed upon determining that the magnitude of light received by the one or more light detectors has crossed a pre-determined threshold.

For example, in some cases, the electronic signal generated by the one or more light detectors can be a voltage signal. In these embodiments, the sensor controller 418 can monitor for variance in the voltage of the electronic signal generated by the one or more light detectors that result from the downward motion of the top surface 402. For example, in some embodiments, as the top surface 402 moves downwardly, the amount of light reflected from the top surface 402 and detected by the one or more light detectors can increase. Correspondingly, the electronic signal generated by the one or more light detectors can exhibit an increase in voltage. In other embodiments, as the top surface 402 moves downwardly, the amount of light reflected from the top surface 402 and detected by the one or more light detectors can decrease. For example, in some embodiments, the one or more light detectors may be separated from the one or more light emitters of each optical sensor by one or more optical barriers. In this manner, as the top surface 402 moves closer to the optical barrier, the amount of light reflected off the top surface 402 and over the optical barrier can decrease.

In some embodiments, the change in voltage of the electronic signal generated by the one or more light detectors can be linear with respect to the position of the top surface 402. In other examples, the change in the voltage of the electronic signal generated by the one or more light detectors can be non-linear with respect to the position of the top surface 402.

In other cases, the electronic signal generated by the one or more light detectors can be a current signal. In these embodiments, the sensor controller 418 can monitor for variance in the current of the electronic signal generated by the one or more light detectors that result from the downward motion of the top surface 402. For example, in some embodiments, as the top surface 402 moves downwardly, the amount of light reflected from the top surface 402 and detected by the one or more light detectors can increase. Correspondingly, the electronic signal generated by the one or more light detectors can exhibit an increase in current. In other embodiments, the current of the electronic signal generated by the one or more light detectors can vary in other ways.

In some embodiments, the electronic signal generated by the one or more light detectors can be a periodic signal. For example, in some cases, the one or more light emitters of each optical sensor can emit a signal whose amplitude or color vary with time in a given pattern. For example, in some cases, the light emitter can emit light with a sinusoidally-varying brightness. Accordingly, the reflection received by the one or more light detectors may also be substantially sinusoidal. In these embodiments, the sensor controller 418 can monitor for variance in the periodicity of the electronic signal generated by the one or more light detectors that result from the downward motion of the top surface 402. For example, in some cases, the sensor controller 418 can monitor the phase of the periodic signal. In other embodiments, the sensor controller can monitor the phase difference of the periodic signal received by the one or more light detectors and the periodic signal generated by the one or more light emitters of each optical sensor. In other examples, other characteristics of the periodic signal can be monitored by the sensor controller.

In some embodiments, the electronic signal generated by the one or more light detectors can be a polarized signal. For example, in some cases, the one or more light emitters of each optical sensor can emit light with a certain polarity. In many cases, the polarity of light may be impacted by reflection from a surface. Accordingly, the reflection received by the one or more light detectors may be polarized to a different degree than the light emitted from the one or more light detectors. In these embodiments, the sensor controller 418 can monitor for variance in the polarity of the electronic signal generated by the one or more light detectors that result from the downward motion of the top surface 402.

In other embodiments, the reflective surface off which the light generated by the one or more light emitters of each optical sensor can include an iridescent pattern, grating, or other reflective characteristic that causes the optical characteristics of light to change given different incident angles of incoming light. In these examples, the color and/or amplitude of light reflected from the top surface can vary with the translation of the top surface downward. In these examples, the sensor controller 418 can monitor the brightness, color, distortion, or clarity of the reflected pattern to determine the location of the top surface.

In other examples, the optical sensors can be implemented with an image detector, instead of or in addition to, the one or more light detectors. For example, an image detector can be a camera element such as a charge-coupled device or a CMOS image sensor. In these examples, the sensor controller 418 can monitor the image output by the image detector in order to determine the location or deflection of the top surface. For example, in one embodiment, the sensor controller 418 can determine the current and/or optimal focus point of the image detector. In other examples, the sensor controller can determine the relative location of one or more features of the underside of the top surface.

Figure 5:
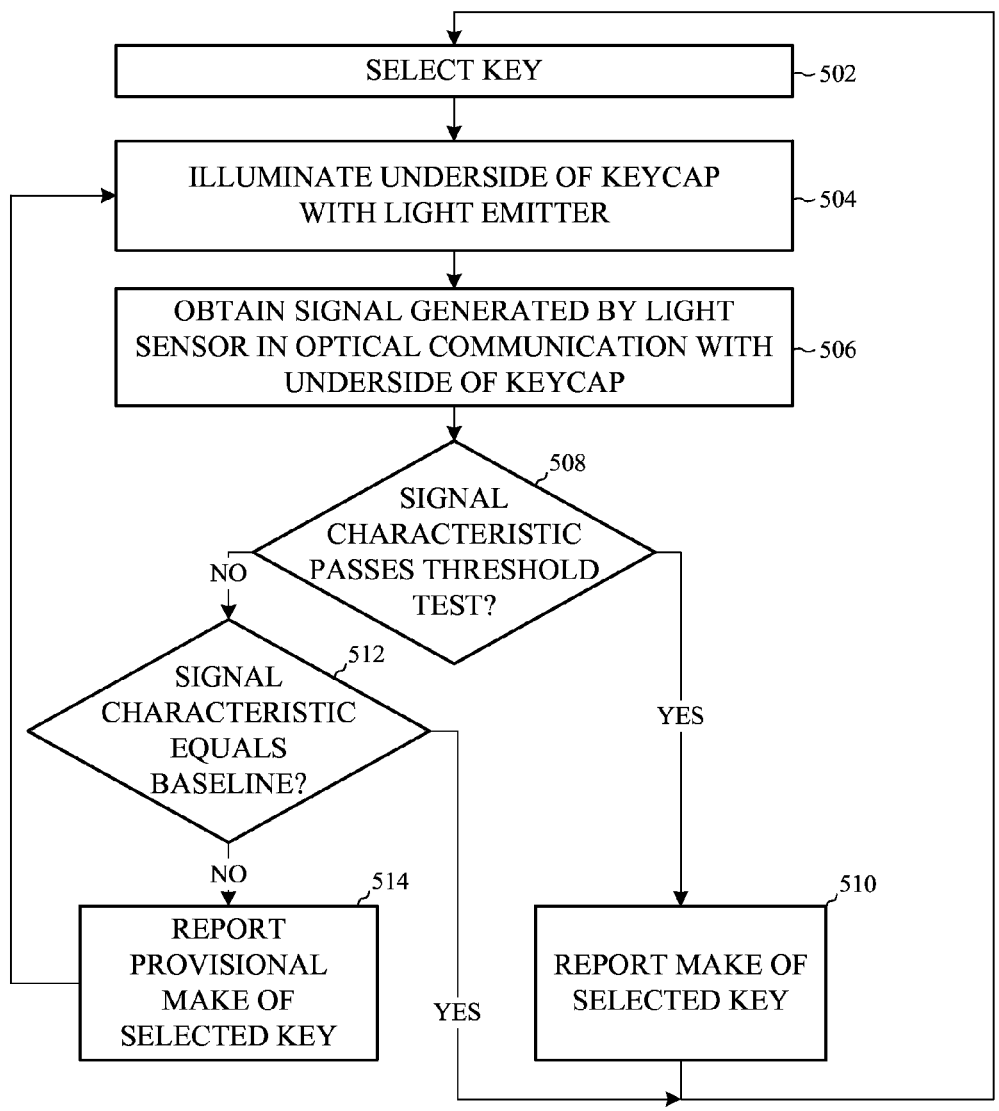
FIG. 5 depicts as a flow chart example operations of a method of detecting actuation of a depressible key associated with a keyboard.

FIG. 5 depicts as a flow chart example operations of a method of detecting actuation of a depressible key associated with a keyboard. The method can begin at operation 502 in which a depressible key of the keyboard is selected. As noted with respect to some embodiments described herein, the depressible key can include a non-contact proximity sensor implemented as an optical sensor having of at least one light emitter and at least one light detector. As noted above, the optical sensor can be disposed below the keycap of the key or, alternatively, can be coupled to one or more light guides that terminate proximate the keycap.

The method can continue at operation 504 in which the light emitter of the optical sensor is caused to illuminate the underside of the keycap. Next, at operation 506 light detector of the optical sensor can receive light reflected or refracted from the underside of the keycap and generates an electrical signal in response. Next, at operation 508, the signal generated by the light detector is analyzed to determine whether one or more characteristics of the signal crosses a pre-determined threshold. This operation is generally referred to herein as a "threshold test."

As noted above, the signal generated by the light detector can be used to obtain an approximation of a distance the keycap has moved, the velocity with which the keycap is moving, the acceleration by which the keycap is moving, and/or the force with which the keycap is pressed. In this manner, a threshold test can determine whether the distance the keycap is moved crosses a pre-determined distance threshold at operation 508. Alternatively or additionally, a threshold test can determine whether the velocity with which the key is moving crosses a pre-determined velocity threshold. Alternatively or additionally, a threshold test can determine whether the acceleration with which the key is moving crosses a pre-determined acceleration threshold. Alternatively or additionally, a threshold test can determine whether the force with which the key is moving crosses a pre-determined force threshold. In still further embodiments, operation 508 can conduct more than one threshold test. For example, the operation 508 can determine whether a determined force crosses a pre-determined force threshold in addition to determining whether a determined distance crosses a pre-determined distance threshold.

In many embodiments, one or more threshold tests can be configured, set, or executed based on an instruction from a computing device coupled to the keyboard. For example, in the case that the keyboard is coupled to a personal computer, one or more threshold tests can be set based on an instruction from the personal computer.

In many cases, the threshold tests can be set based on a current user of the computer. For example, a first user of the computer can be associated with a first threshold test and a second user of the computer can be associated with a second threshold test. In one example, the first user may be associated with threshold tests having high force thresholds and a second user may be associated with threshold tests have low distance thresholds. Upon determining that the first user is operating the personal computer, the personal computer can communicate to the keyboard the appropriate high-force threshold tests to administer. Alternatively, upon determining that the second user is operating the personal computer, the personal computer can communicate to the keyboard the appropriate low-distance thresholds tests to administer.

In some embodiments, a personal computer can adjust one or more threshold tests for more keys (e.g., different keys of a keyboard may be assigned different threshold tests) based on an application or program operating on the personal computer at a particular time. In one embodiment, the a force-based threshold may be different for certain keys when the personal computer is operating a word processing application than when the personal computer is operating a gaming application. For example, in some cases, a personal computer can lower one or more thresholds upon determining that a certain key or set of keys are more likely than others to be pressed in a particular application.

Similarly, a personal computer can raise one or more thresholds upon determining that a certain key or set of keys are less likely than others to be pressed in a particular application. In one non-limiting example, a personal computer operating a word processing application can lower thresholds for alphanumeric keys, while increasing thresholds for function keys. In this example, a user of the keyboard is less likely to accidentally press one or more function keys because the threshold for pressing said keys is increased.

In some embodiments, modification of threshold tests administered for particular keys or users can be performed by the keyboard itself.

Next, if the method determines that the signal obtained from the light detector passes the threshold test, the method can continue to operation 510 during which a keypress can be reported. Next, the method can return to operation 502 by selecting another depressible key.

Alternatively, if the method at operation 508 determines that the signal obtained from the light detector does not pass the threshold test, the method can continue to operation 512 during which the method determines whether the signal obtained from the light detector is above a pre-determined baseline value. If the operation 512 determines that signal obtained from the light detector is equal to the baseline (e.g., is not changed from a baseline value), the method can conclude that the selected key is not pressed by a user. Accordingly, the method can return to operation 502 by selecting another depressible key. In some embodiments, keys can be selected in a sequences, for example, by scanning from one key to the next by iterating through individual rows and individual columns of keys.

Alternatively, if the method at operation 512 determines that the signal obtained from the light detector is not equal to the baseline, the method can determine that the key is currently in the process of being pressed but has not yet exceeded the required threshold to pass the threshold test of operation 508. Accordingly the method can continue to operation 514 which can report a provisional keypress. Thereafter, the operation can continue to operation 504.

In some embodiments, a keyboard can provisionally report a depressible keypress to an electronic device prior to reporting a complete keypress to the electronic device. For example, as noted above, the keyboard may report a depressible keypress upon determining that one or more pre-determined thresholds are crossed. In these examples, a keyboard can provisionally report a depressible keypress upon determining that the output from the light detector of an optical sensor of particular key has not crossed the one or more pre-determined thresholds, but is nevertheless determined to be offset from a particular pre-determined baseline value. In other words, a provisional keypress report can indicate to an electronic device that a depressible key is in the process of being pressed. In these examples, an electronic device can submit provisional keypress reports to a text prediction, spelling, grammar, or other language or input interpretation engine.

In some embodiments, one or more pre-determined thresholds can be fixed values or, in some embodiments, one or more pre-determined thresholds can be values output from an equation, formula, or algorithm. In still further examples, one or more pre-determined thresholds can be obtained via one or more lookup tables. In other cases, one or more pre-determined thresholds can be obtained from a third party device or service.

Figure 6:
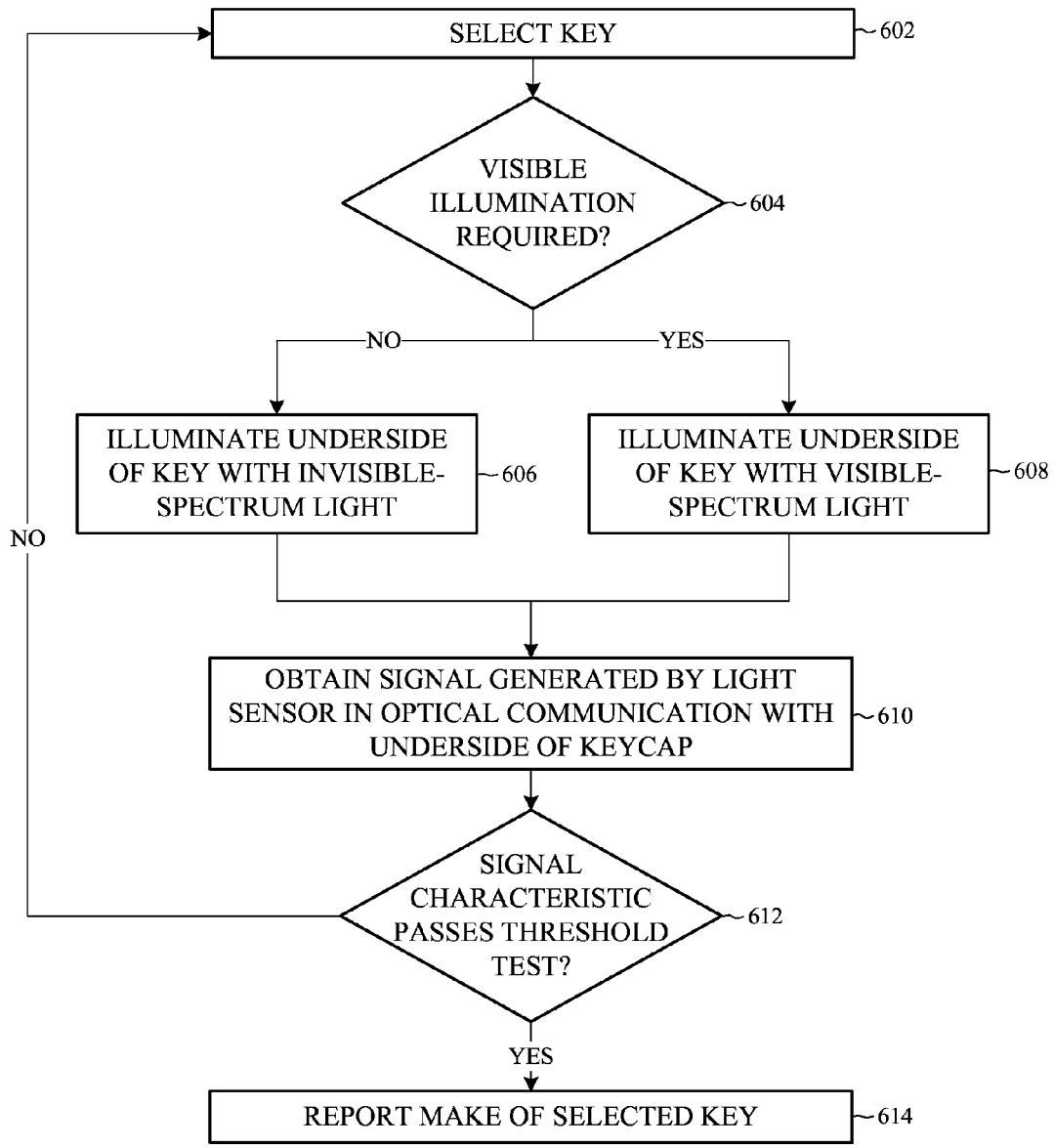
FIG. 6 depicts as a flow chart example operations of a method of detecting actuation of a depressible key associated with a keyboard.

FIG. 6 depicts as a flow chart example operations of a method of detecting actuation of a depressible key associated with a keyboard. The method can begin at operation 602 in which a depressible key of a keyboard is selected. As noted with respect to some embodiments described herein, the depressible key can include a non-contact proximity sensor implemented as an optical sensor having of at least one light emitter and at least one light detector. As noted above, the optical sensor can be disposed below the keycap of the key or, alternatively, can be coupled to one or more light guides that terminate proximate the keycap.

The method can continue at operation 604 in which the method determines whether illumination of the selected key is required. If the operation at 604 determines that illumination of the key is not required, the method can continue at operation 606 in which the light emitter of the optical sensor is caused to illuminate the underside of the keycap with invisible light, such as infrared light. If the operation at 604 determines that illumination of the key is required, the method can continue at operation 608 in which the light emitter of the optical sensor is caused to illuminate the underside of the keycap with visible light, such as with white light.

Next, at operation 610, the light detector of the optical sensor can receive light reflected or refracted (either invisible or visible) from the underside of the keycap and can generate an electrical signal in response. Next, at operation 612, the signal generated by the light detector is analyzed to determine whether one or more characteristics of the signal pass a threshold test.

Next, if the method determines that the signal obtained from the light detector passes the threshold test, the method can continue to operation 614 during which a keypress can be reported. Next, the method can return to operation 602 by selecting another depressible key.

Alternatively, if the method at operation 612 determines that the signal obtained from the light detector does not pass the threshold test, the method can return to operation 602 by selecting another depressible key.

One may appreciate that although many embodiments are disclosed above, that the operations and steps presented with respect to methods and techniques described herein are meant as exemplary and accordingly are not exhaustive. One may further appreciate that alternate step order or, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. A keyboard comprising:
   a plurality of keys, including at least one key comprising:
   a keycap comprising an optically reflective bottom surface;
   a travel mechanism coupled to an underside of the keycap; and
   a non-contact proximity sensor comprising:
   a light emitter oriented to emit light toward the reflective bottom surface; and
   a light detector oriented to receive light reflected from the reflective bottom surface; and
   a keyboard controller coupled to the non-contact proximity sensor, the keyboard controller configured to:
   measure changes in distance between the keycap and the non-contact proximity sensor based on the received light; and
   determine an amount of force exerted on the keycap based on a rate of change of the measured changes in distance between the keycap and the non-contact proximity sensor, wherein
   the light emitter emits visible light if the keycap is to be illuminated or invisible light if the keycap is not to be illuminated.

2. The keyboard of claim 1, wherein the light emitter is configured to emit light in the infrared spectrum.

3. The keyboard of claim 1, wherein the light emitter is configured to emit light in the visible spectrum.

4. The keyboard of claim 3, wherein the light emitter is configured to emit white light of selectable brightness.

5. The keyboard of claim 1, wherein the light emitter is configured to emit light in the infrared spectrum and light in the visible spectrum.

6. The keyboard of claim 1, wherein the light detector is configured to generate an electrical signal in response to receiving infrared light.

7. The keyboard of claim 1, wherein:
   the light detector is configured to generate an electrical signal indicating the changes in distance between the light emitter and the light detector in response to receiving visible light; and
   the keyboard controller is further configured to receive the electrical signal from the light detector.

8. The keyboard of claim 7, wherein the keyboard controller is configured to determine the amount of force applied to the keycap based on a second order rate of change in the electrical signal.

9. The keyboard of claim 7, wherein the keyboard controller is configured to determine the rate of change by analyzing the electrical signal.

10. The keyboard of claim 7, wherein the keyboard controller is configured to measure the change in distance between the keycap and the non-contact proximity sensor based on a change in magnitude of the electrical signal.

11. The keyboard of claim 1, wherein the non-contact proximity sensor further comprises:
    a first light guide associated with a first of the plurality of keys;
    a second light guide associated with a second of the plurality of keys; and
    a multiplexor configured to selectively couple the light detector with the first light guide or the second light guide such that the light detector receives light reflected from a respective reflective bottom surface.

12. A depressible key comprising:
    a keycap comprising an optically reflective bottom surface;
    a travel mechanism coupled to an underside of the keycap;
    a tactile feedback structure configured to collapse in response to a force applied to the keycap; and
    an optical sensor comprising:
    a light emitter positioned below the keycap and oriented to emit light toward the reflective bottom surface; and
    a light detector positioned below the keycap and oriented to receive light reflected from the reflective bottom surface and measure distances of travel of the keycap; and
    a controller coupled to the optical sensor and configured to:

determine whether to illuminate the keycap;

cause the light emitter to emit visible light if the keycap is to be illuminated;

cause the light emitter to emit invisible light if the keycap is not to be illuminated; and determine an amount of force exerted on the keycap based on a rate of change of the measured distances of travel of the keycap.

13. The depressible key of claim 12, wherein the optically reflective bottom surface comprises a polished metal material.

14. The depressible key of claim 12, wherein:

the travel mechanism is aligned to the geometric center of the keycap; and the tactile feedback structure is nested within the travel mechanism.

15. The depressible key of claim 12, wherein the light emitter comprises a light emitting diode.

16. The depressible key of claim 12, wherein the light detector comprises a photodiode.

17. A method of detecting a press of a depressible key, comprising:

illuminating an underside of a keycap with a wavelength of light, the wavelength of light comprising a visible wavelength of light if the keycap is to be illuminated or an invisible wavelength of light if the keycap is not to be illuminated;

receiving an electrical signal corresponding to an amplitude of light reflected from the underside of the keycap;

determining distances of travel of the keycap based on the electrical signal;

determining at least one of a velocity, an acceleration, or an amount of force of the keycap based on a rate of change of the determined distances of travel; and reporting a press of the key if the distance of travel of the keycap passes a first threshold and the at least one of the velocity, the acceleration, or the amount of force of the keycap passes a second threshold.

18. The method of claim 17, wherein if the distance of travel of the keycap passes the first threshold and the amount of force of the keycap passes the second threshold, reporting the press of the key.

19. The method of claim 17, further comprising:

determining a force applied to the keycap based on a second order rate of change of the electrical signal.

20. The method of claim 17, wherein the selected wavelength of light is infrared.

* * * * *